United States Patent
Janssen

(10) Patent No.: US 8,858,177 B2
(45) Date of Patent: Oct. 14, 2014

(54) FLUID TURBINE

(75) Inventor: Adrian Janssen, Exwick (GB)

(73) Assignee: Momentum Holdings Limited, Exeter (GB)

( * ) Notice: Subject to any disclaimer, the term of this patent is extended or adjusted under 35 U.S.C. 154(b) by 1284 days.

(21) Appl. No.: 12/452,111

(22) PCT Filed: Apr. 8, 2008

(86) PCT No.: PCT/GB2008/001213
§ 371 (c)(1),
(2), (4) Date: Dec. 14, 2009

(87) PCT Pub. No.: WO2008/125806
PCT Pub. Date: Oct. 23, 2008

(65) Prior Publication Data
US 2010/0278647 A1 Nov. 4, 2010

(30) Foreign Application Priority Data

Apr. 12, 2007 (GB) .................................. 0707006.3

(51) Int. Cl.
*F03D 3/06* (2006.01)
(52) U.S. Cl.
CPC ................. *F03D 3/068* (2013.01); *Y02E 10/28* (2013.01); *Y02E 10/74* (2013.01); *F05B 2200/20* (2013.01); *F05B 2210/16* (2013.01); *F05B 2260/72* (2013.01)
USPC ....................................... 416/104; 416/132 B
(58) Field of Classification Search
USPC ................. 416/103, 104, 108, 110, 112, 131, 416/132 A, 132 B, 141, 223 R, 235, 243
See application file for complete search history.

(56) References Cited

U.S. PATENT DOCUMENTS

| 4,260,328 A | 4/1981 | Hamel |
| 4,380,417 A | 4/1983 | Fork |
| 4,609,827 A * | 9/1986 | Nepple ........................... 290/44 |
| 4,618,312 A | 10/1986 | Williams |
| 5,251,507 A | 10/1993 | Takahara et al. |
| 5,324,164 A | 6/1994 | Doering et al. |
| 5,380,149 A * | 1/1995 | Valsamidis .................... 415/2.1 |
| 6,179,563 B1 * | 1/2001 | Minchey ......................... 416/17 |
| 7,766,601 B2 * | 8/2010 | Vida Marques ............... 415/4.2 |
| 2003/0185666 A1 | 10/2003 | Ursua |
| 2008/0019833 A1 * | 1/2008 | Martin ...................... 416/132 B |
| 2008/0236159 A1 * | 10/2008 | Tierney .......................... 60/499 |

FOREIGN PATENT DOCUMENTS

| BE | 1013928 | 12/2002 |
| DE | 10123544 | 2/2002 |
| EP | 0046122 | 2/1982 |

(Continued)

*Primary Examiner* — Edward Look
*Assistant Examiner* — Jason Davis

(57) ABSTRACT

A turbine for extracting power from a flowing fluid comprises a blade for interaction with the fluid, the blade being rotatable both about a primary axis and a blade axis. The blade axis is proximate to the blade, substantially parallel to the primary axis and spaced therefrom. Rotation actuating means is provided to rotate the blade about the blade axis in dependence upon the rotation of the blade about the primary axis such that the rotation angle of the blade about the blade axis is a function of the rotation angle of the blade about the primary axis. The rotation of the blade about the blade axis is in the same direction of rotation as the blade axis about the primary axis.

33 Claims, 11 Drawing Sheets

(56) References Cited

FOREIGN PATENT DOCUMENTS

| | | | | |
|---|---|---|---|---|
| EP | 1457672 | 9/2004 | | |
| FR | 2845428 | 4/2004 | | |
| GB | 2241747 A * | 9/1991 | ................ | F03D 3/00 |
| GB | 2263735 | 8/1993 | | |
| GB | 2373028 | 11/2002 | | |
| JP | 2004353637 | 12/2004 | | |
| WO | 9303277 | 2/1993 | | |
| WO | 0040859 | 7/2000 | | |
| WO | 2005100785 | 10/2005 | | |
| WO | WO 2006013273 A1 * | 2/2006 | ................ | F03D 3/06 |

\* cited by examiner

Drag coefficient Cd variation with angle of incidence (θ) of flow to surface of blade Lift Coefficient Cl variation with angle of incidence (θ) of flow to surface of blade Torque on axis as a function of arm angle θ and blade angle φ. (Static model without blade movement)

Rotation angle locus of blade φ with respect to the blade rotation angle θ around the central axis.

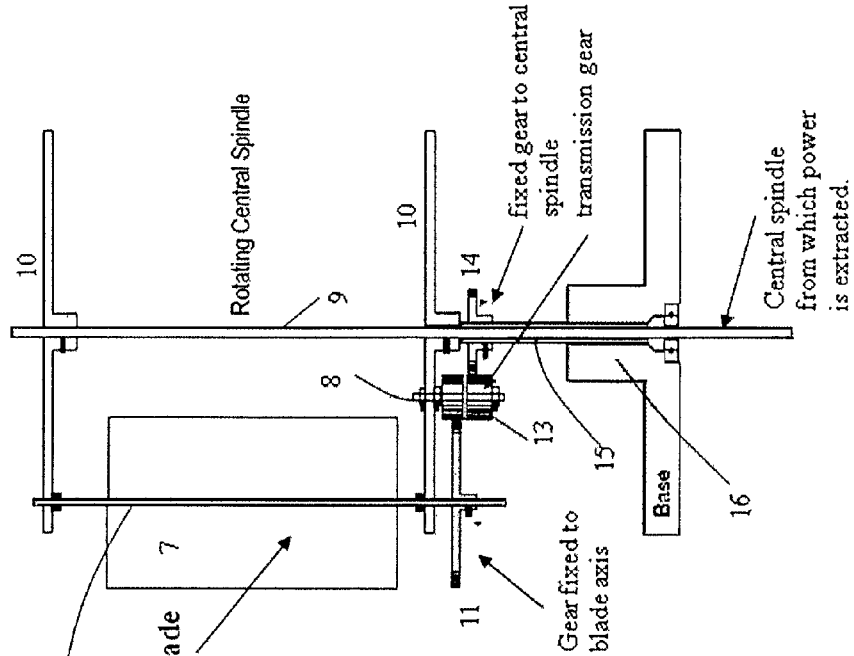
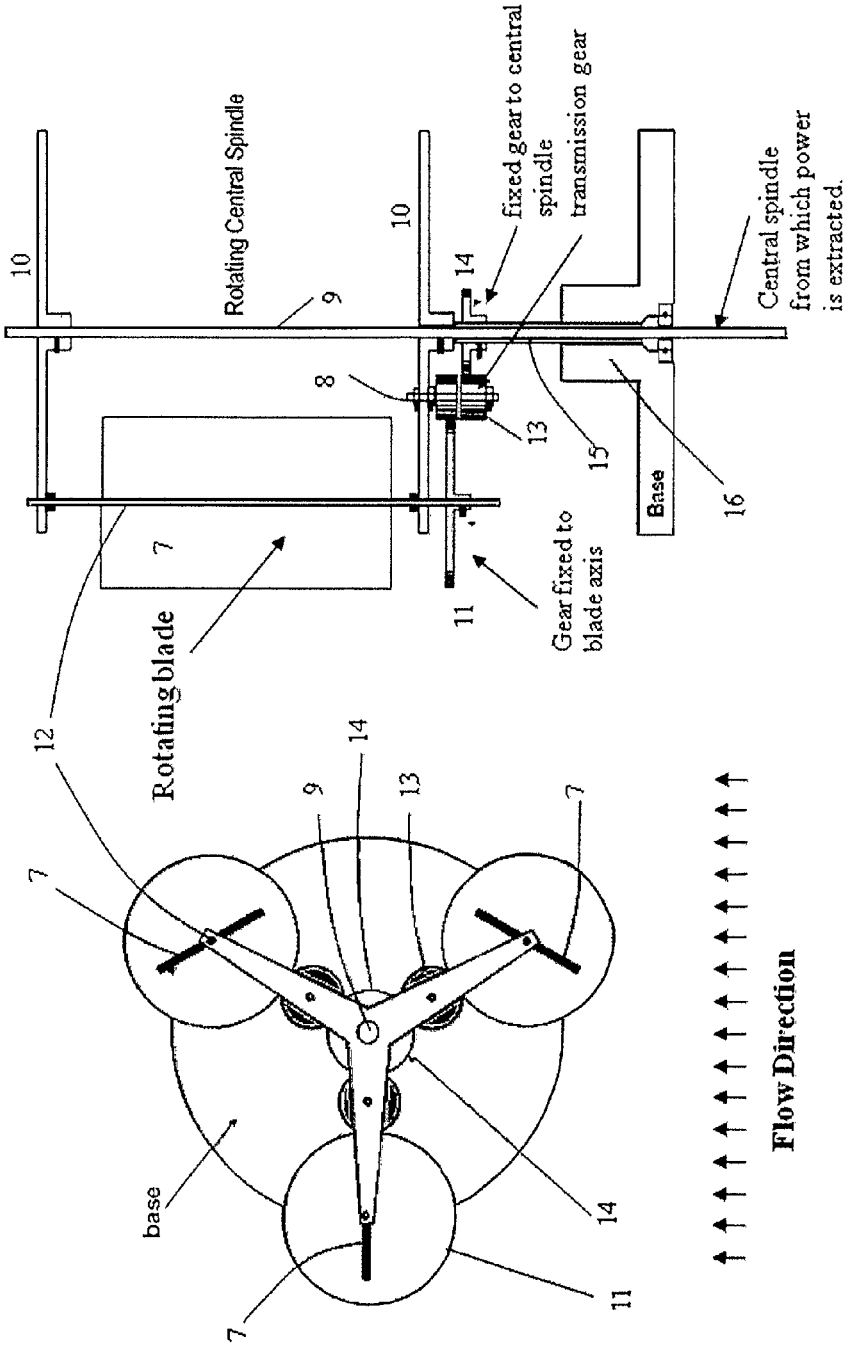
Figure 3a
Figure 3b

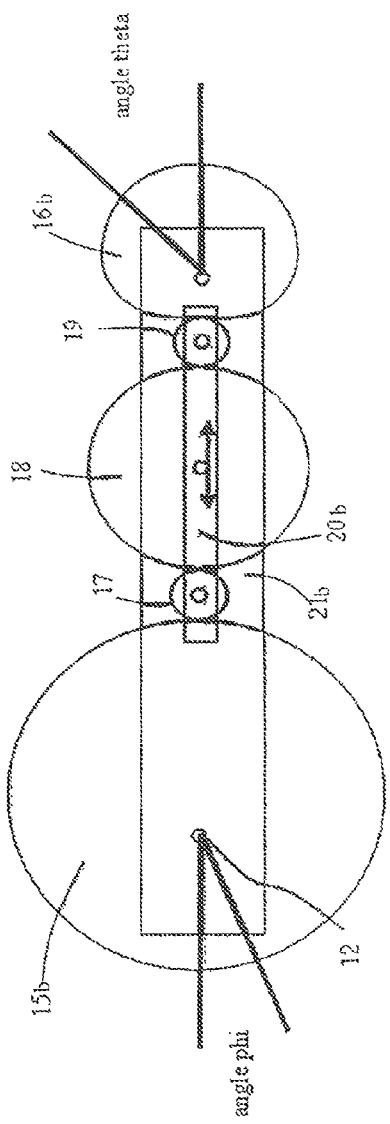
Figure 6a  Non-circular gear train giving variation of gear ratio for optimised blade angular rotation
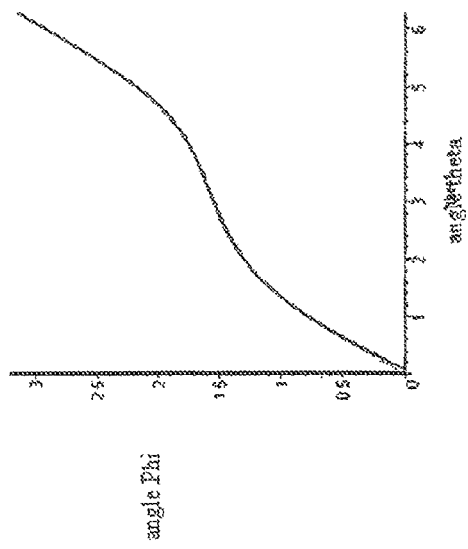
Figure 6b Figure 8  Power Delivered by turbine blade dependence on angle of blade (phi) and angle of rotation around Central axis (theta)

Figure 9  Non-circular chain drive giving modulation of gear ratio for optimised blade angular rotation

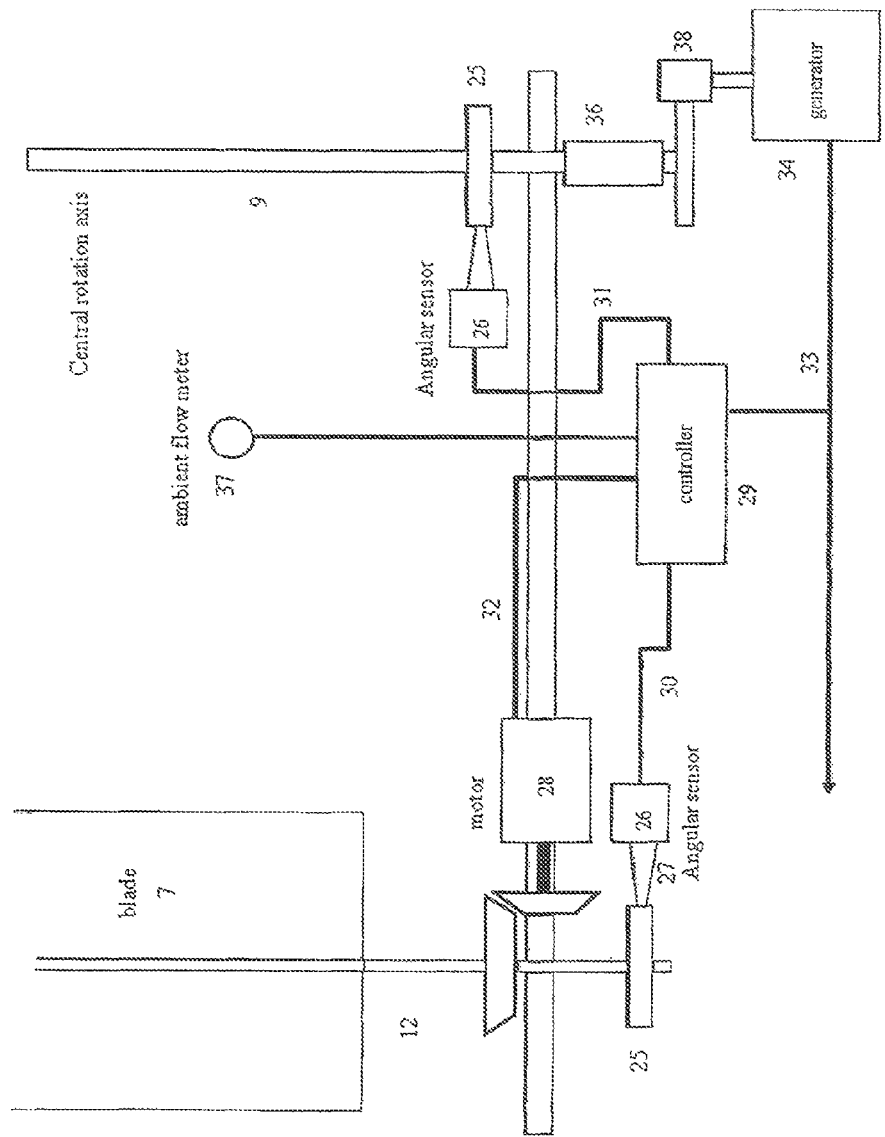
Figure 11  Method of motorised angular control of the blades

FLUID TURBINE

FIELD OF THE INVENTION

This invention relates to the extraction of power from a flowing fluid by means of a bladed turbine. Such a turbine may be used to generate electrical energy from fluid flow such as river water flow, tidal water flow or from wind.

BACKGROUND OF THE INVENTION

Various devices used in the extraction of energy are known in the art using two basic mechanisms: these are variously denoted by; i) "drag" or "momentum transfer" or "momentum reversal" and ii) by "lift". Known devices typically use one or other of these mechanisms. Momentum transfer systems rely on the fluid flow pushing against a vane, paddle or blade so that the vane is pushed in the same direction as the flow. A well-known example of a momentum transfer type device is the Pelton Wheel. However, during a full rotation cycle the cups produce significant drag on the return half of the cycle and therefore the efficiency is reduced. For this reason, such designs have not found favour for wind generation schemes, although their simplicity makes them ideal for use as anemometers for example where power efficiency is not an important consideration.

Another conventional means of transferring energy to a moving part is by use of the lift mechanism, such as the horizontal propeller blade turbine. With lift-type devices, the blade is impelled in a direction perpendicular to the direction of flow.

In the extraction of energy from a fluid or gas medium, a key parameter of importance and means of comparison of various methods is the efficiency with which energy is extracted. Efficiency is compared over a common area over which a mechanism intercepts the fluid. The efficiency in this case is defined as the ratio of the extracted power from the fluid flow over a defined area compared to the power available over the same area. The available power is proportional to the cube of the mean flow velocity and it can be shown that there is a fundamental limit to the amount of power per unit area that can be extracted from any medium flow. The efficiency used to compare different mechanisms is therefore defined as the power generated compared to that which would be theoretically available under the optimum load condition over an intercept area A.

In considering the force F perpendicular to the flow direction produced by flow against an inclined plate, the lift coefficient $C_l$ is shown in FIG. 1a with dependence on incident flow angle, according to $$F = \frac{1}{2} \cdot C_l \cdot m \cdot v^2$$

The maximum lift coefficient is about 1 and at large angles it approximates a sinusoidal function. At an angle of 90 degrees where the flow, designated by z in FIG. 1a, is parallel to the plate normal, the lift force is zero. The drag force defined as the force in the direction of flow is determined by the drag coefficient $C_d$ according to $$F = \frac{1}{2} \cdot C_d \cdot m \cdot v^2$$

FIG. 1b shows that the drag force is a maximum when the plate normal is aligned to the flow direction and varies approximately sinusoidally with incident angle, being zero when the plate surface normal is perpendicular to the flow direction. The maximum drag force coefficient of about 2 is about twice that of the lift coefficient for a thin plate. Thus, for power conversion, it is advantageous to include drag or momentum reversal effects, since the maximum efficiency factor is high. For a mechanism which utilises drag such as the Pelton wheel, the drag force is reversed over half the rotation and thus considerably reduces the efficiency. In lift-based designs the efficiency factor is optimised for a particular flow velocity by means of the blade incidence angle, therefore at low velocities and high velocities the efficiency is low. Consequently external means may have to be introduced to start the turbine particularly at low flow velocities. Vertical turbine types such as Savonius and Darrieus turbines are examples with low efficiencies at low flow velocities. Both the conventional horizontal and vertical rotating aerofoil blade turbines rely on lift. It is defined that lift forces act perpendicularly to the flow direction as in an aeroplane wing, whereas drag forces act in the direction of flow. The lift force depends on the attack (incidence) angle of the aerofoil blade, its area and its cross-section geometry. The section geometries are well understood and are characterised in the NACA numbered catalogue for their aerodynamic properties. They are typified by angles of attack between zero degrees to about twenty degrees of incidence to the flow, beyond which the wing is liable to stall. As above, the lift force can be expressed in terms of the lift coefficient $C_l$:

$$L = \frac{1}{2} C_l \cdot \rho \cdot V^2 \cdot A$$

where A is the aerofoil area, V is the flow velocity relative to the foil and $\rho$ is the density of the flowing medium. Similarly, the drag force D can be expressed in terms of a drag coefficient $C_d$:

$$D = \frac{1}{2} C_d \cdot \rho \cdot V^2 \cdot A$$

Although drag mechanisms are not generally used to advantage in aerodynamics, for situations where the flow velocity is to be deliberately reduced, it is clear that from measurement of various plates that the drag mechanism can be about twice as efficient as the lift mechanism for producing utilisable force.

It is known to provide a vertical mill-type turbine in which each or several blades is rotatable about its respective axis, and also at a fixed distance (radius) about a common central axis, all these axes being parallel. Such devices include those disclosed in GB-A-2373028, JP-A-2004353637, EP-A1-1457672, BE-A-1013928, DE-A1-10123544 and FR-A1-2845428, GB 2241 747A, GB 2263 735A Such known turbines provide a simple linear relationship between the angle of each blade and the angle of rotation of that blade about the common central axis, to provide a blade rotation profile such as shown in graph FIG. 2a, denoted by the central line labelled 1, in which each blade turns through $\pi$ radians during one complete revolution about the central axis. The linear relationship between the respective rotations is shown by the line 1 joining the origin (0,0) with points 3 and 4. In other words, after a complete revolution about the central axis, each blade will be in the same position as it was before, but rotated through 180°. The lift and drag forces on a blade and the angular definitions are shown in FIG. 2b.

In addition to the strictly linear relationship between the rotation of the blade around its own axis and the rotation of the blade axis about a common central axis as cited, there is also defined by Goodden (GB 2241 747A, GB 2263 735A) that the blades may rotate counter directionally to the rotation around the common axis. It is also known that oscillation of the blade about its axis rather than complete rotation about its axis can be used to cause rotation of the central axis in a flowing medium. This is exemplified by Doering U.S. Pat. No. 5,324, 164, Hamel U.S. Pat. No. 4,260,328, Unyushiyou JP55057672, Raymo EP0046122, Williams U.S. Pat. No. 4,618,312, Fork U.S. Pat. No. 4,380,417. However, these turbines suffer from inefficiency as the drag and lift contributions are not maximised, and cannot take into account factors such as blade interaction as discussed above.

The present considerations of full rotation of the blade in the same direction of the rotation about the common central axis therefore fall outside of the above.

SUMMARY OF THE INVENTION

According to a first aspect of the present invention, there is provided a turbine for extracting power from a flowing fluid, comprising:
a blade or blades for interaction with the fluid, the blades being rotatable both about a primary axis and a blade axis, the blade axis being proximate to the blade and substantially parallel to the primary axis and spaced therefrom, and rotation actuating means to rotate the blade about the blade axis in dependence upon the rotation of the blade about the primary axis such that the rotation direction of the blade about the blade axis is the same as that of the rotation direction of the blade about the primary axis, wherein the blade rotation angle about its axis can depart from a linear relationship with respect to the rotation angle about the common central axis but is within an angle of 45 degrees ($\pi/4$) of the linear relationship defined where the rotation angle of the blade about its axis is half the rotation angle of the blade axis about the common central axis.

The turbine preferably comprises a plurality of blades, each blade being rotatable about both the primary axis and a respective blade axis proximate the respective blade, which axis is parallel to, and spaced from, the primary axis, and wherein the rotation actuating means rotates each blade about its respective blade axis in dependence upon the rotation of each blade about the primary axis. Some means of achieving the relationship between the two rotation angles $\theta$ and $\phi$ as shown in the hatched domain 6 in FIG. 2a The present invention provides a turbine that addresses the above problems in providing maximum efficiency by combining lift and momentum reversal such that and in contrast to Goodden, the rotation of the blade is limited to rotation in the same rotation direction around its axis as about the common central axis. The invention provides a turbine with a rotating spindle motivated by a number of vanes which can be rotated or inclined to a fluid flow and which are enabled to utilise specific amounts of both lift and momentum change mechanisms in the appropriate position with respect to the flow direction.

An embodiment of a three-bladed design is shown in FIG. 3a and FIG. 3b, where the fluid flow direction z is presented vertically to the page as shown and the mill blades turn in the clockwise direction. The blade 7 on the left (FIG. 3a) provides maximum drag or momentum change effect, while the drag effect of the other two blades is much reduced so that there is greater net force acting on the left of the mill than the right, so causing rotation. There will also be a lift force contribution dependent on the blade angle $\phi$ at intermediate positions. Since the degree to which lift and momentum reversal effects are dependent on the absolute flow velocities, rotation speed, viscosity and other parameters, it is required to be able to vary the dependence of the relative rotations of the blades about their axes with respect to rotation about the common central axis. The angular domain over which this will be useful is therefore defined in this application to be within and limited to a region surrounding the defined linear dependence as shown in FIG. 2a by the shaded region 6 extending over an angular region about the central line connecting (0,0) to ($2\pi,4\pi$).

For periodically rotating blades or vanes, the available dynamic variables which can be optimised as a function of blade rotation angle around a central axis are:
i) blade radial distance $R(\theta)$ from a central axis from which the angle is measured,
ii) instantaneous angular velocity $v=d\theta/dt$ where v has period $2\pi$,
iii) blade angle, $\phi(\theta)$, and
iv) blade area, $A(\theta)$.

These variables are shown in FIG. 5. The prior art does not specify variation of the above factors other than a linear (proportional) dependence of the blade angle with respect to the central rotation angle, i.e. $\Phi=\theta/2$. The present invention encompasses and considers the above variable $\phi(\theta)$ dependent according to the above constraints on the central rotation angle $\theta$ as a means to providing optimisation on energy extraction efficiency under different environmental and material flow conditions.

Within the present scope of mechanisms utilising both lift and momentum reversal, there are additional parameters which can be varied to optimise the power extraction efficiency and provide a more efficient mechanism for power conversion than those turbines which only utilise lift where the fluid flow direction is near perpendicular to the vane or blade surface normal. These include:—
i) the ability of a given area of cross-section to intercept the fastest stream flow where the stream velocity is not uniform. For tidal water flow for example where the flow velocity varies with depth above the bed this may be achieved by arranging the axis of rotation to be horizontal and such that the larger flow rate occurs for the maximum momentum reversal blade orientation and lower flow occurs for the returning blade;
ii) increasing the horizontal length of the blade in order to achieve a large area where the depth within the flow stream is small. In this case the length to diameter ratio of the blade can be large;
iii) the ability to minimise the effects of vortex shedding and turbulence by the provision of plates at the ends of the blades which maintain the flow direction over the plates and additionally serve to protect any gearing mechanism designed to rotate the blades in (i) above;
iv) the ability to optimise any interactive effects between blades and to aid efficiency by defining the relative dimensions and geometry of the blades as well as defining the interdependence of blade rotation and central axis rotation.
v) the ability to redirect flow to and from the turbine thus increasing the effective capture area or increasing the effective flow velocity. It is well known that this may be achieved by the provision of guiding blades parallel to the turbine axis and which are placed ahead or behind the turbine to funnel flow into and out of the turbine.

In accordance with a second aspect of the present invention, there is provided a turbine for extracting power from a flowing fluid, comprising:
a blade for interaction with the fluid, the blade being rotatable both about a primary axis and a blade axis, the blade axis being proximate to the blade and substantially parallel to the primary axis and spaced therefrom, a primary spindle substantially co-axial with the primary axis, a blade spindle substantially co-axial with the blade axis, the blade being mounted on the blade spindle, and a cap mounted at an end of the primary spindle such that the cap is rotatable about the primary axis.

BRIEF DESCRIPTION OF THE DRAWINGS

FIGS. 3a and b show an embodiment of the turbine showing blades 7 supported and rotated around axis 12 which is fixed into plates 10 at either end. The plates 10 are fixed to a common central axis 9 which rotates and transfers power to a load. Gear train 11, 13 and 14 are eccentric or non-circular in order to achieve the angular paths described.

FIG. 6a shows an embodiment of a gear train referred to in FIG. 3 such as to produce an optimised angular locus of the blade about the central axis shown in FIG. 6b, where the loci of blade angles falls within the domain referred to in FIG. 2a. The gear train shows eccentric non-circular gears 15b and 16b which rotation is transferred by means of intermediate circular gears 17, 18, 19. FIG. 6b illustrates the angular path between the blade $\phi(\theta)$ about the common central axis 8 for specific gear forms 15b and 16b shown in FIG. 6a.

FIG. 7 shows an embodiment of the gear train incorporating eccentric gears and non-circular gears mounted on the rotation plate 10 by which means rotation of the blade is defined within the domain shown in FIG. 2a.

FIG. 11 shows an alternative blade drive and control method in accordance with the first aspect of the present invention whereby each blade is driven by a motor independently using a rotation sensor and controller.

DESCRIPTION OF THE PREFERRED EMBODIMENTS

Figure 1B:
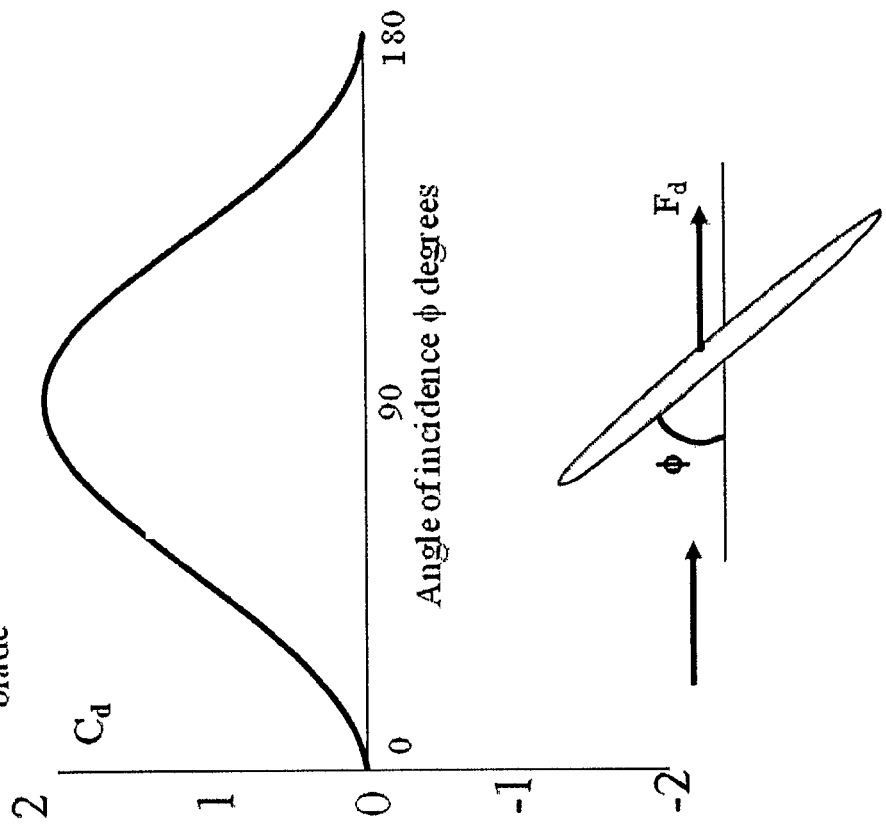
FIGS. 1a,b shows the conventional lift (1a) and drag or momentum reversal (1b) functions for a flat plate inclined to a flowing medium, where the lift force is defined in a direction perpendicular to the flow direction and drag (momentum reversal) is defined in a direction parallel to the flow direction.
Figure 1A:
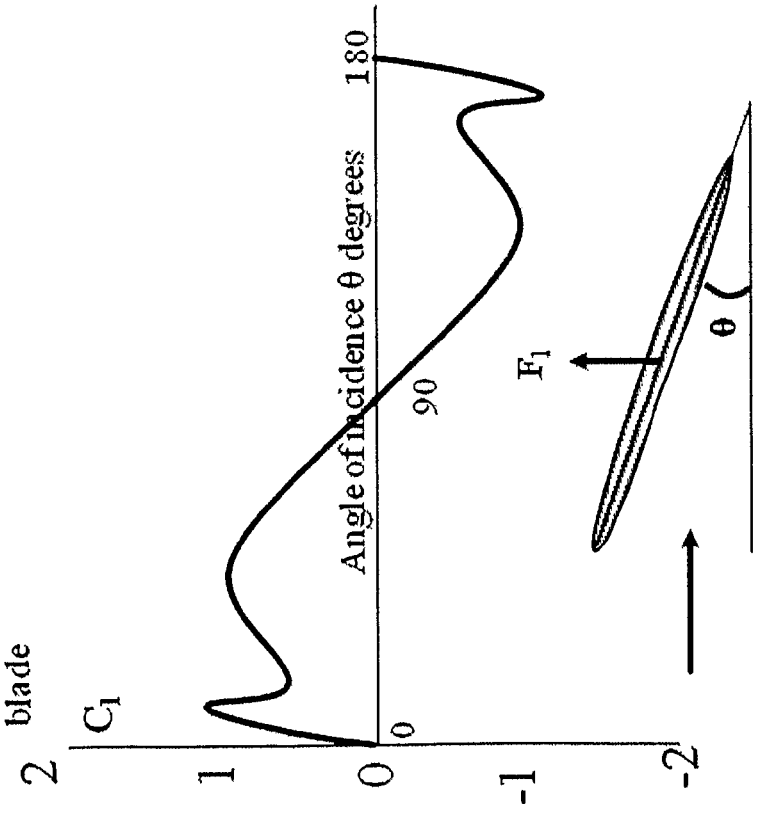
Figure 2B:
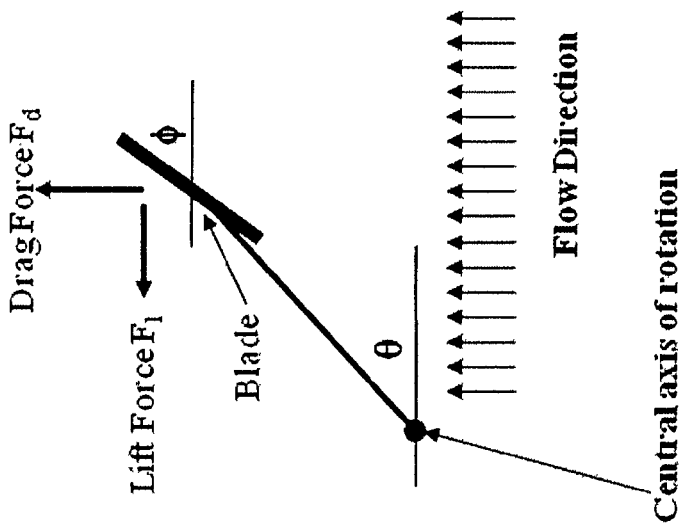
FIGS. 2a and 2b describe describes the angular relationship between the rotation of the blade (vane) ($\phi$) about its own axis and the rotation ($\theta$) of the blade axis about a common central axis where the allowed blade angles according to the present invention are shown by the shaded region 3 about the line 1 which defines the relationship between ($\phi$) and ($\theta$) where d$\phi$=d$\theta$/2 and where d$\phi$ and d$\theta$ are incremental changes in angle.
Figure 2A:
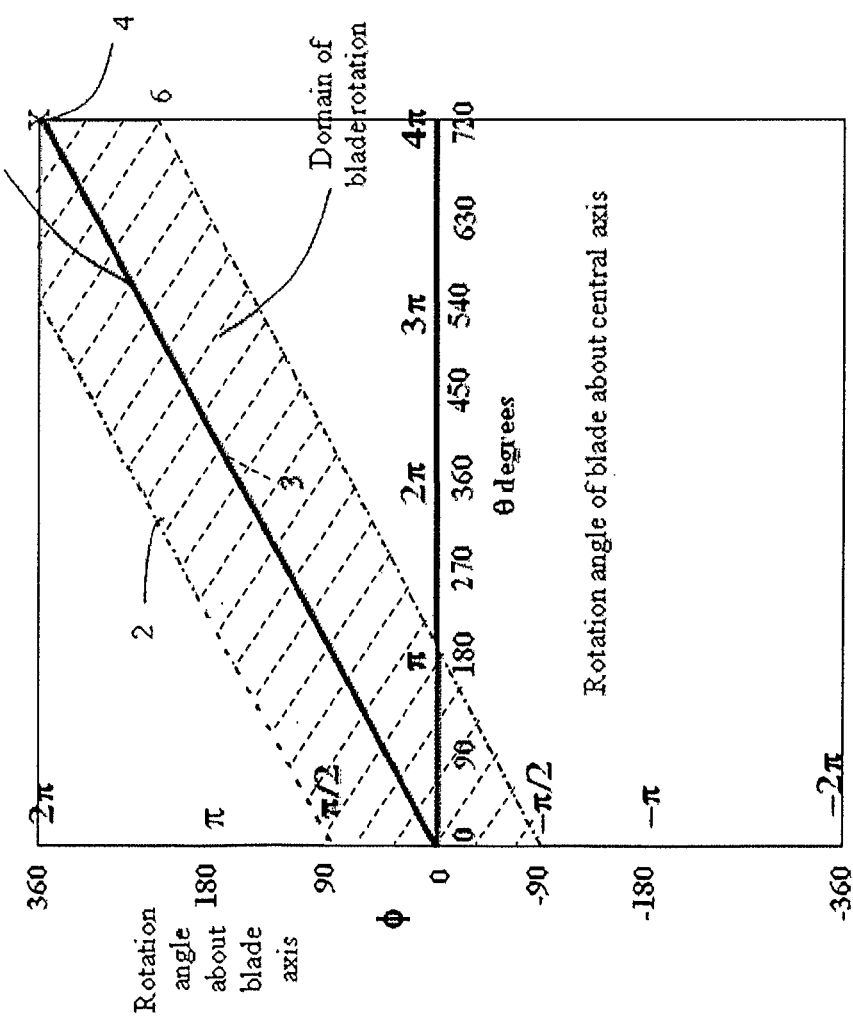
Figure 4:
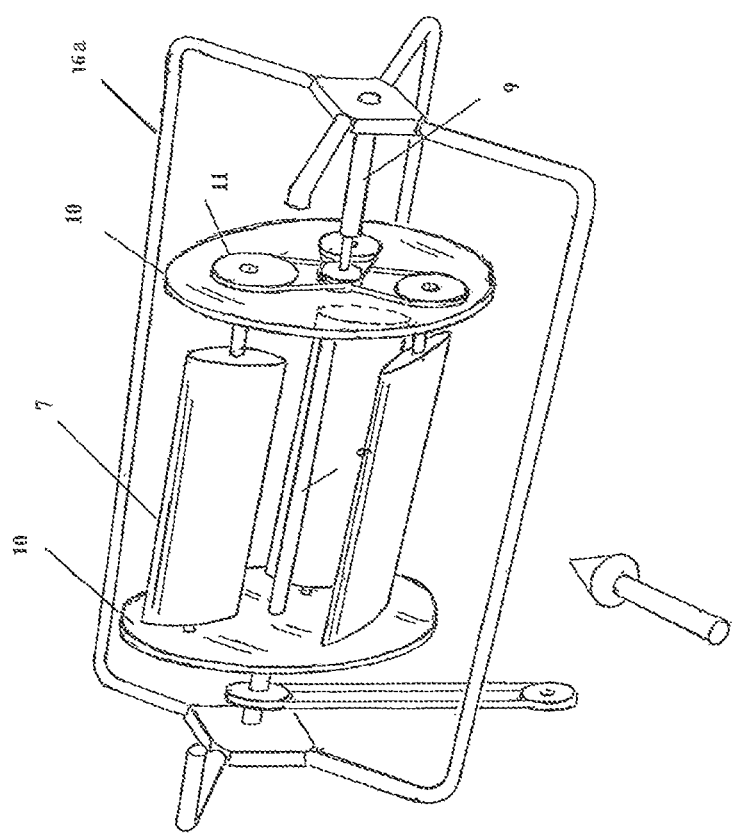
FIG. 4 shows an embodiment of the turbine where the turbine rotor is held within a rotation reference frame which also provides mechanical support to ends of the rotor and where rotation angles of the blades are fixed by a chain or belt over non-circular or eccentric gears.
Figure 7:
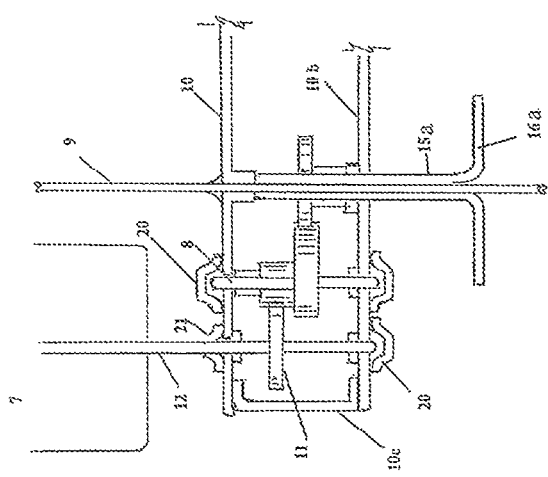

Referring to FIGS. 3a and 3b, the turbine blade 7 is fixed by its spindle 12 to top and bottom plates 10 where the axis is located by holes in the plates through which the spindle passes. A gear 11 is fixed to the spindle 12. A gear set 13 is allowed to freely rotate about a spindle 8 fixed to the bottom plate 10. This gear set meshes with gear 11. Gear 14 is fixed to a cylindrical outer spindle 15 which is also fixed to a base 16. Gear set 13 also meshes with gear 14 which may be eccentrically mounted or non-circular. Gear set 13 comprises either one or two gears fixed on the same spindle and rotate together such that a top gear meshes with gear 11 and a bottom gear meshes with gear 14 or vice versa. The two gears comprising set 13 may be different diameters or one or both may be eccentrically mounted or non-circular. The gear set comprising 11, 13 and 14 acts such that when the spindle 12 is rotated about the central axis (spindle 9), the blade rotates about its axis (spindle 12) within the domain described in FIG. 2a. Power is accessed via the rotation of the central spindle 9 within the cylindrical outer spindle 15 whereby the cylindrical outer spindle 15 attached to the base 16 acts as a rotation reference. The rotation reference is also illustrated by the framework 16a shown in FIG. 4. This framework also serves to support the rotor assembly. In this example the blade angle control is by means of a chain and gear or belt and toothed pulley. A further embodiment of the rotation mechanism is shown in FIG. 7 where the non-circular gear train is seen in section. The gear 11 and meshing of gear 13 are circular and have ratio 2:1. The gear 13 and meshing of gear 14 have nominally unity ratio (the same number of teeth about the circumference) but they are either eccentric or non-circular. The gear 14 is fixed to the tube 15a and thereby to the frame 16a which does not rotate. The solutions to the non-circular gear geometry conditions imposed by meshing with fixed axis separation are well known (Toshiyuki U.S. Pat. No. 5,251,507 for example). These combinations of gears allow a strictly 2:1 angular ratio at the points 3 and 4 referring to FIG. 2a, but allow variation in the rotation path away from the 2:1 ratio at other rotation angles within the hatched domain defined in FIG. 2a. In FIG. 7 the gear mechanism supported by plates 10 and 10b is contained within the plates 10 and 10b and can be isolated with an end cap 10c which is fixed to plates 10 and 10b such that the assembly 10, 10b, 10c forms an enclosure which can be sealed around the complete mechanism. The caps 20 serve to provide hermetic seals to stopped spindles 8 and 12. The grommets 21 serve to seal the spindles 12 and 15. Casing 10,10b and 10c are affixed to the central spindle 9 and they rotate together. Spindle 9 rotates within the reference tube 15a and frame 16a. The rotation actuating means may comprise a gear train. In this case, the gear train may comprise at least one gear which is eccentrically mounted for rotation, and/or at least one substantially non-circular gear.

FIG. 6 shows another embodiment in accordance with the invention for achieving this path by means of a gear train for mechanically driving rotation of a blade from rotation of the primary axis comprising non-circular and eccentrically-mounted gears. Two end gears 15b and 16b, for connection to a blade spindle and the primary spindle respectively, are designed to give net rotation ratio of 2:1 over 2π, i.e. two complete revolutions of gear 16b results in one complete revolution of gear 15b. Since the separation between the two gears 15b, 16b is forced to be variable by virtue of the non-circularity, the rotation is transferred between the two without changing the angular dependence by means of satellite circular gear train 17, 18, 19. There may be an alternative number of gears comprising the gear train to transfer the rotation from 16b to 15b. This allows freedom of separation between 15b and 16b without altering the rotation dependence. The circular gears 17, 18, 19 are held in a moving assembly 20b which is free to slide from side to side along a linear bearing in a carrier plate 21b. In the figure, gears 15b and 16b are eccentrically-mounted for rotation, where gears 15b and 16b are also non-circular. Of course, many other combinations of non-circular and eccentrically-mounted gears may be used to provide non-linear profiles. The non-circular gear 16b is held fixed at the common axis around which the arm 21b revolves together with and on which is mounted the eccentrically mounted gear 15b. The rotation of the vane is fixed to the rotation of this gear 15b. Rotation velocity of 15b is determined by the ratio of contact radius between the two gears 15b and 16b. The circular gears 17, 18 and 19 are free to move along the axis between the gears 15b and 16b and are held by the track 20b. As with the design shown in FIG. 7, the arrangement also preserves the correct rotation direction as defined in FIG. 2a. The profiles of gears 15b and 16b will determine the rotation profile between the blade about its own axis and rotation of the blade axis about the common central axis. It is also a condition that the number of peripheral teeth on gear 15b is twice the number on gear 16b to give a nominal full rotation ratio of 2:1. The solid line of FIG. 6b shows the rotation ratio for the gears shown 15b and 16b which deviates from the condition φ=θ/2.

Figure 8:
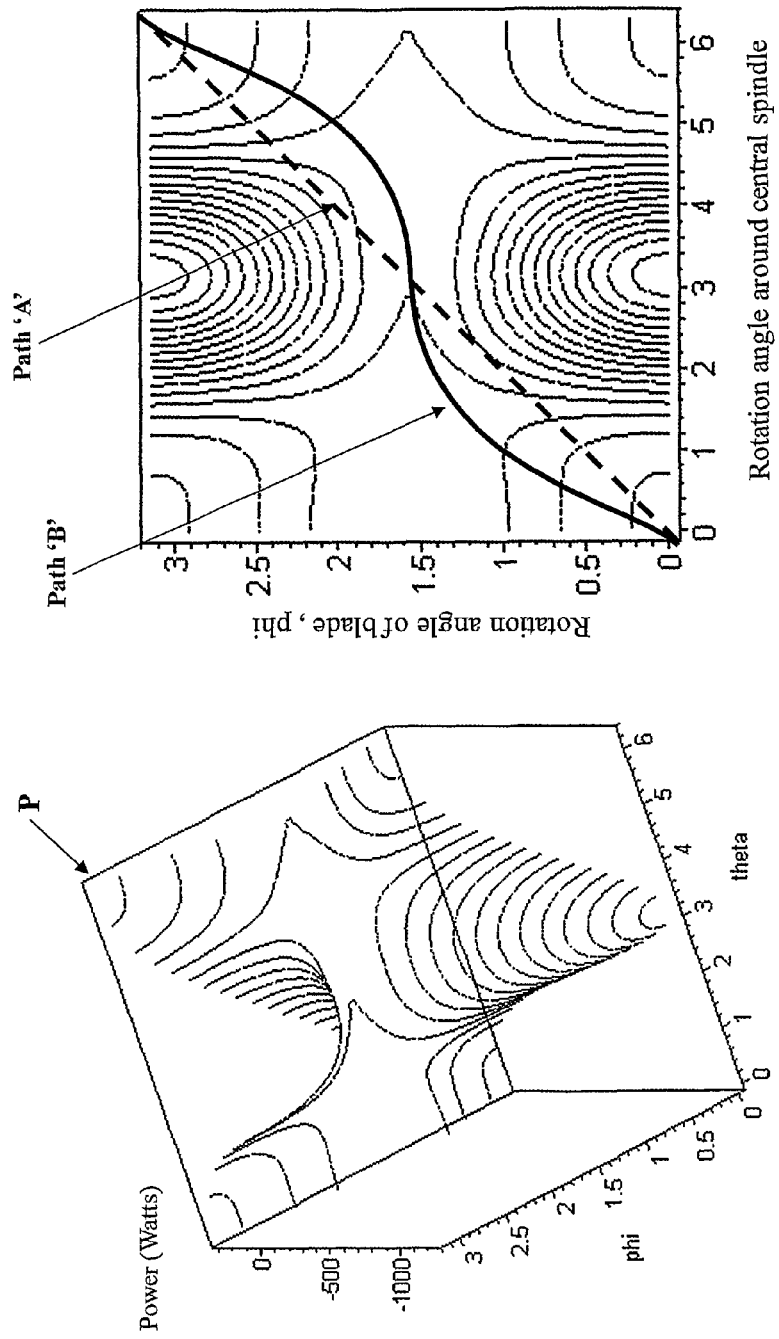
FIG. 8a shows a typical power performance surface dependent on blade rotation angle $\phi(\theta)$ and the central rotation angle $\theta$. Here it is apparent that the surface has a maximum power path in progressing from the origin (0,0) to the point P where the blade has completed a full rotation about the central axis. The purpose of the invention is to operate the device close to the maximum power path shown as path B (FIG. 8b) in this example.

FIG. 8a, b shows the power as a function of both angle around the central spindle and angle of the blade. There is a path on the power surface which represents the greatest total power in going from the origin (0, 0) to point P one complete cycle of rotation around the central spindle. This is shown for a specific ratio of the blade angular rotation tangential velocity around the primary spindle 9 and the flow velocity. In this case the total power over a complete rotation cycle is given by the integrated power over the path shown and the non-linear path is obtained by use of either of the gear arrangements described in FIG. 6a or 7 or 9. The paths A and B show the linear dependence of phi and theta for a conventional circular gear or chain system and the path b) shows how the power path may be optimised through 360 degrees of rotation around the central axis. It is important that the blade is rotated to an angle whereby it does not experience a large counter (negative) torque acting against the rotation of the central axis. In FIGS. 8a, b there are shown two positions which require energy to rotate (negative power) at phi=zero and phi=Pi, and where theta=Pi. In this position the blade area is facing the flow direction but rotating against the flow. For a constant rotation ratio (phi/theta) the path relating phi and theta is linear (path A) but part of the path dips into the regions of negative power referred to above. The maximum power is achieved by maintaining the highest path from theta=0 to theta=2Pi. It is clear that to avoid dropping into the lowest power regions, the path B has to be bent around these dips as shown in FIG. 8b, i.e. the path has to have a non-linear profile as previously described.

Figure 5:
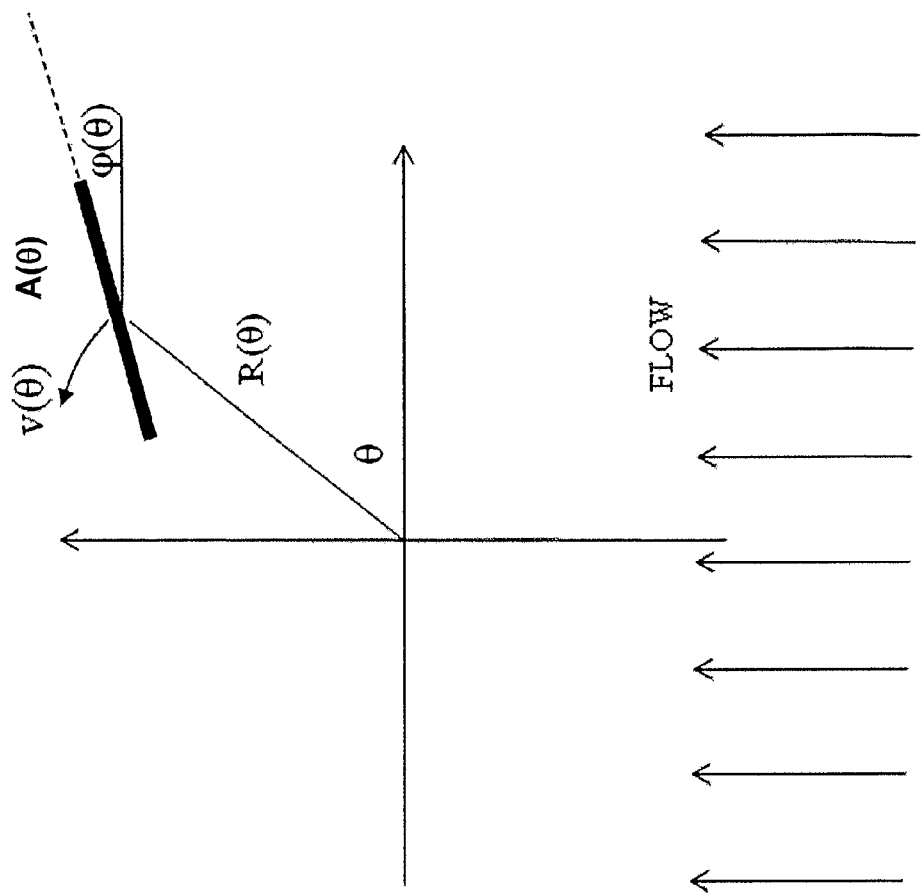
FIG. 5 illustrates the operating variables: blade angle $\phi(\theta)$, radial velocity of blade about central axis v($\theta$), radius of blade axis from central axis R($\theta$), blade area A($\theta$) denoted as dependent on the central rotation angle $\theta$. This application considers only the variable $\phi(\theta)$.
Figure 9:
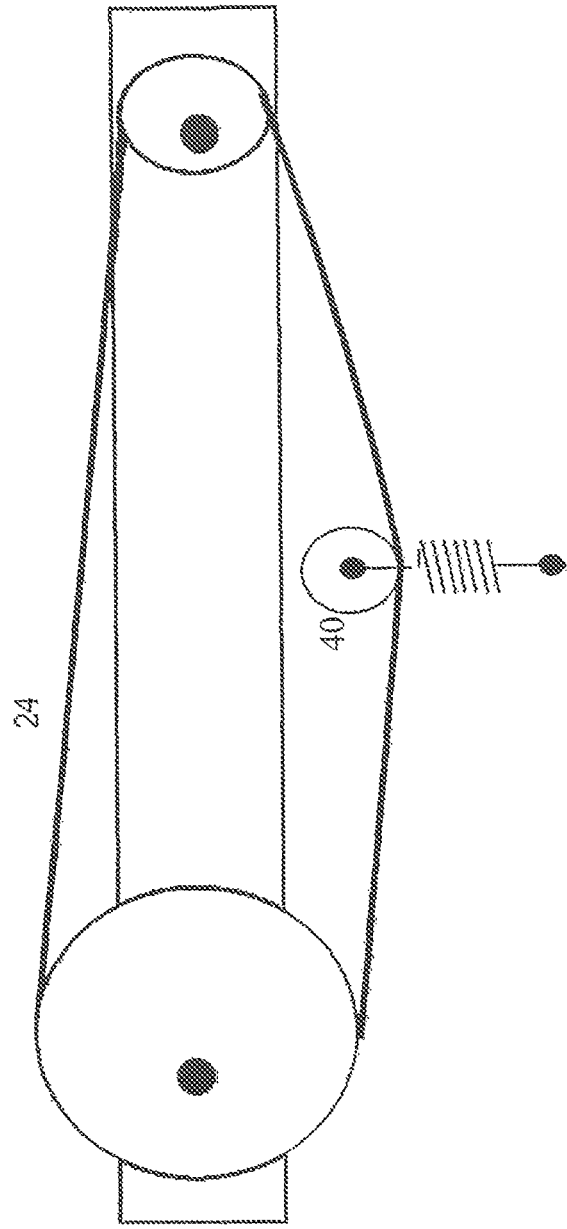
FIG. 9 shows an embodiment of a method of achieving a path described by FIG. 6b and within the domain shown in FIG. 2a by use of a toothed pulley and belt system as an alternative to a gear train, where the pulleys are circular and eccentrically mounted or non-circular or a combination of both.
Figure 10:
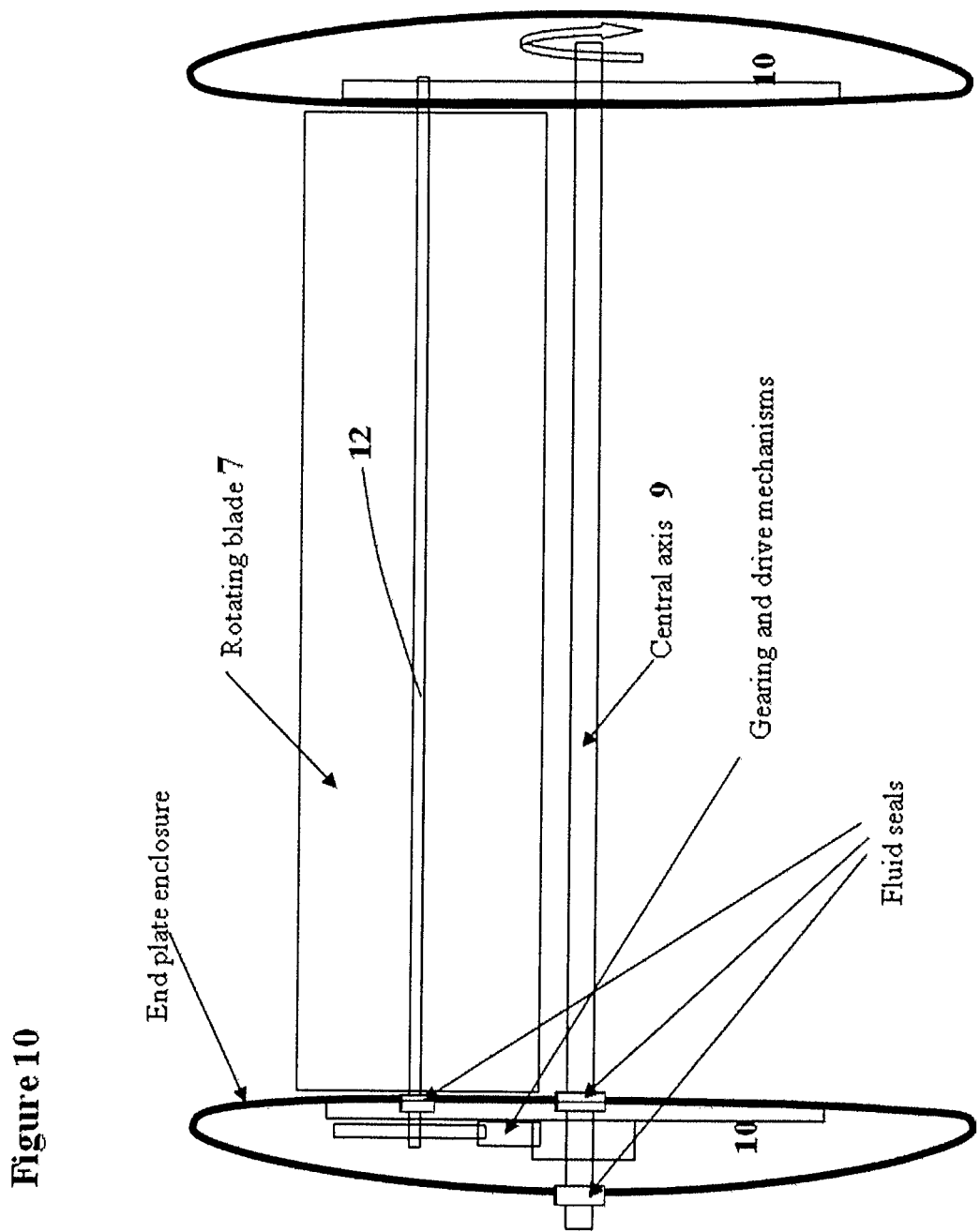
FIG. 10 shows the end-plate disposed to support and protect the gearing or other mechanical means for controlling the blade rotations as shown in FIG. 7 and for providing boundaries for flow at the ends of the blades.

In another embodiment, the rotation actuating means may comprise a toothed belt mounted on toothed pulleys. At least one pulley may be eccentrically mounted for rotation, and/or is substantially non-circular. This design may provide a simpler mechanism for achieving the desired non-linear rotation profile. An exemplary method is shown in FIG. 9 where the angular path is similar to that shown in FIG. 5. The toothed belt 24 may also have an idler gear 40 designed to maintain the belt tension throughout the rotation where the idler gear 40 is free to move against a spring force.

A further embodiment is that the rotation actuating means comprises a motor connected for rotating the/or each blade about its blade axis and a controller for controlling driving of the motor as shown in FIG. 11. The controller may determine the rotation angle of the blade about the primary and or blade axis from an angular sensor. The controller may use a fixed algorithm to control driving of the motor. Alternatively, the controller may control the driving of the motor in dependence on at least one of the power output of the turbine and the speed of fluid flow proximate the turbine. This driving arrangement allows time variable driving of the blades, e.g. to take into account varying flow conditions and more complex non-linear rotation relationships than are possible with mechanical rotation transfer means.

In a particular embodiment, the cross-section of the/or each blade in the plane orthogonal to the blade axis has four-fold mirror symmetry about its axis. In another embodiment the cross-section of the or each blade in the plane orthogonal to the blade axis has 180° rotational symmetry such that there is a concave section on one side of the blade and a convex section on the other side. This design similar to a Pelton wheel would assist in rotation of the blade. The blade forms are such that the extremities from the axis are narrower than the central thickness. The central part is necessarily of greater thickness than other parts of the blade for reasons of mechanical strength. As the blade rotates about its blade axis one complete revolution for every two revolutions of rotation about the primary axis, it is natural that the blade geometry should possess 180 degree rotational symmetry. Additionally, the edge of the blade is thinned so that, when positioned with the narrowest section to the flow direction (i.e. edge-on), the flow is split without turbulence and with least resistance to the flow. The best overall section geometry may be selected according to the intended application or specific flow operating conditions.

Preferably, the turbine comprises a primary spindle substantially co-axial with the primary axis and a blade spindle substantially co-axial with the blade axis, the blade being mounted on the blade spindle. Advantageously, the turbine may comprise a cap mounted at an end of the primary spindle such that the cap is rotatable about the primary axis, and wherein the cap houses the rotation actuating means. An additional cap may be mounted at the other end or at each end of the primary spindle as shown in FIG. 9 wherein the or each cap shape may be adapted to guide fluid flow toward the turbine and or each cap may be adapted to minimise the occurrence of turbulence and vortices within the fluid flow. This also provides robust protection of the rotation actuating mechanism and aids guidance of flow into the turbine, as well as reducing vortex shedding.

Another method, not shown, of linking the rotations between the blade and the central axis in a non-linear way is by means of a drive shaft connecting non-linear gears in a gearbox. In this embodiment there is a gear-box located close to the central shaft and incorporating the gear fixed to the static central axis 9. A transmission shaft rotates from the central gear-box to another gear box located close to the each blade and meshes with a gear fixed to the blade such that they co-rotate. There are then separate transmission shafts to each blade from the central hub.

FIG. 11 shows an embodiment for controlling the rotation of the blade with respect to its rotation around the primary axis using a motor drive where the motor rotation is controlled for each blade and can be programmed to rotate the blade along any angular path. The rotation of the motor drive is determined by an angle sensor 26 measuring rotation of primary spindle 9 and a sensor 27 measuring rotation of blade spindle 12. A controller 29 activates a motor 28 depending on an error signal between the two optical sensors 26 & 27 which read the angle from a digitised bar code on drums 25 fixed to respective spindles 9 and 12, and an algorithm representing the required phi-theta path. This provides a very flexible method of controlling the rotation of the blades. This method can also compensate for changes in path due to changes in flow velocity in order to achieve maximum power. The controller 29 can receive sensing signals from the rotation sensors 26 via lines 30 and 31 and also from a generator 34 via line 33. The controller 29 sends the required control signal to the rotation motor 28 via a line 32. The control of the blade angles can be predetermined by a fixed algorithm relating the angle of the blades to the angle of rotation around the primary axis, or the blade angles can be adjusted such that the algorithm is also sensitive to the output power via line 33 from the power generator 34. The generator is geared to the primary spindle 9 via gears 36 and 38. The controller may also receive a signal from a separate flow velocity sensor 37 which can be situated in front of, by the side of or behind the turbine. If the controller receives a signal related to the output power of the turbine generator, it can be arranged such that the algorithm controlling the blades will iteratively find the optimised blade angle by searching for the blade angle which produces the greatest mean power over a number of rotations. Adaptive Dynamic Control such as this may maintain close to optimum power conditions under all other circumstances such as changes in flow rates and changes in flow direction.

A simpler system can be implemented whereby, if the interdependence of a number of parameters such as flow rate, blade angle, and the dependence of the efficiency of the turbine on these is known, then a static algorithm can be used such that the controller does not rely on measurement of the generator output power or the rotation position. In this case there is no control feedback since the efficiency for any condition is assumed to be predictable. Additionally, due to varying flow conditions, blade-blade interactions or for any other reason the static algorithm may not be assumed to be optimal and the output load and rotation positions of the blades may not be optimally known for all conditions. It is suggested that search algorithms may be designed to find the optimum rotation paths for blades by monitoring the output power and adjusting the rotation paths and/or load or other variable parameters in order to maximise the output power.

The invention claimed is:

1. A turbine for extracting power from a flowing fluid, comprising:
a blade for interaction with the fluid, the blade being rotatable both about a primary axis and a blade axis, the blade axis being proximate to the blade and substantially parallel to the primary axis and spaced therefrom, and
rotation actuating means to rotate the blade about the blade axis in dependence upon the rotation of the blade about the primary axis such that the rotation angle of the blade about the blade axis is a function of the rotation angle of the blade about the primary axis,
wherein the rotation of the blade about the blade axis is in the same direction of rotation as the blade axis about the primary axis, and
wherein the rotation actuating means is contained within a sealed housing.

2. A turbine as claimed in claim 1, comprising a plurality of blades, each blade being rotatable about both the primary axis and a respective blade axis proximate the respective blade, which axis is parallel to, and spaced from, the primary axis, and wherein the rotation actuating means rotates each blade about its respective blade axis in dependence upon the rotation of each blade about the primary axis such that a rotation of 180 degrees of the blade about its axis coincides with 360 degrees rotation of the blade axis about the primary axis and such that this ratio between the rotation angle of the blade about its axis and the rotation angle of the blade axis is not held constant or the same value at any other angles.

3. A turbine as claimed in claim 1, wherein the angle of the blade about its own axis obeys a relationship such that the change in angular rotation of the blade axis about its axis is within 45 degrees of half the change in the angular rotation of the blade axis about the central axis.

4. A turbine as claimed in claim 3, wherein the rotation actuating means comprises a gear train and wherein the gear train comprises at least one gear which is eccentrically mounted to accomplish the change in angular rotation of the blade axis about the central axis.

5. A turbine as claimed in claim 1, wherein the rotation actuating means comprises a gear train and wherein the gear train comprises at least one substantially non-circular gear.

6. A turbine as claimed in claim 1, wherein the rotation actuating means comprises a belt mounted on pulleys.

7. A turbine as claimed in claim 6, wherein at least one pulley is eccentrically mounted for rotation.

8. A turbine as claimed in claim 6, wherein at least one pulley is substantially non-circular.

9. A turbine as claimed in claim 1, wherein the blade rotation actuating means comprises a motor connected for rotating the/or each blade about its blade axis and a controller for controlling driving of the motor.

10. A turbine as claimed in claim 9, wherein the controller determines the rotation angle of the blade about the primary and or blade axis from an angular sensor.

11. A turbine as claimed in claim 9, wherein the controller uses a fixed algorithm to control driving of the motor.

12. A turbine as claimed in claim 9, wherein the controller controls the driving of the motor in dependence on at least one of the power output of the turbine and the speed of fluid flow proximate the turbine.

13. A turbine as claimed in claim 1, wherein the cross-section of the blade in the plane orthogonal to the blade axis has 180° rotational symmetry.

14. A turbine as claimed in claim 1, wherein the cross-section of the blade in the plane orthogonal to the blade axis is symmetric about its length.

15. A turbine as claimed in claim 1, wherein the cross-section of the blade in the plane orthogonal to the blade axis is rotationally symmetrical about its axis, such that each side of the blade has both concave and convex regions such that flow provides additional rotational torque about the axis of rotation of the blade.

16. A turbine as claimed in claim 1, comprising fluid flow guidance means for concentrating a portion of the flow towards the turbine.

17. A turbine as claimed in claim 16, wherein the fluid flow guidance means comprises a funnel or guidance plates for concentrating flow into the turbine.

18. A turbine as claimed in claim 1, comprising fluid flow guidance means for dispersing a portion of the flow away from the turbine.

19. A turbine as claimed in claim 18, wherein the fluid flow guidance means comprises a funnel or guidance plates for dispersing flow away from the turbine.

20. A turbine as claimed in claim 1, further comprising a turbine rotor constrained by a framework which provides a means of maintaining the position of the turbine rotor and a means of providing a rotation reference frame.

21. A turbine as claimed in claim 1, comprising a primary spindle substantially co-axial with the primary axis and a blade spindle substantially co-axial with the blade axis, the blade being mounted on the blade spindle.

22. A turbine as claimed in claim 21, comprising a cap mounted at an end of the primary spindle such that the cap is rotatable about the primary axis, and wherein the cap houses the rotation actuating means.

23. A turbine as claimed in claim 22, comprising an additional cap mounted at the other end of the primary spindle.

24. A turbine as claimed in claim 23, wherein the/or each cap is adapted to guide fluid flow toward the turbine.

25. A turbine as claimed in claim 23, wherein the/or each cap is adapted to minimise the occurrence of turbulence within the fluid flow and to control vortex shedding from the blade.

26. A turbine as claimed in claim 1, in which the blade angle is controlled by a controller which responds to an independent measurement of the flow velocity local to the turbine.

27. A turbine as claimed in claim 1, comprising a primary spindle substantially co-axial with the primary axis and a generator geared to the primary spindle.

28. A turbine as claimed in claim 1, in which the blade rotation and angle is driven by a motor and measured by a local angular sensor whose information is used by a controller to drive the motor.

29. A turbine as claimed in claim 1, in which an angular sensor is used to determine the turbine rotation angle about the central axis.

30. A turbine for extracting power from a flowing fluid, comprising:
 a blade for interaction with the fluid, the blade being rotatable both about a primary axis and a blade axis, the blade axis being proximate to the blade and substantially parallel to the primary axis and spaced therefrom,
 a primary spindle substantially co-axial with the primary axis,
 a blade spindle substantially co-axial with the blade axis, the blade being mounted on the blade spindle, and
 a cap mounted at an end of the primary spindle such that the cap is rotatable about the primary axis,
 wherein the turbine comprises rotation actuating means to rotate the blade about the blade axis in dependence upon the rotation of the blade about the primary axis, the rotation actuating means being housed within the cap, and
 wherein the rotation actuating means is contained within a sealed housing.

31. A turbine as claimed in claim 30, which includes a set of blades so arranged that each blade is positioned in a different phase to others and rotates around a common axis of a central disc.

32. A turbine as claimed in claim 31, which includes sets of blades which rotate around the common axis.

33. A turbine as claimed in claim 30, such that the housing is rotatable about a central axis and provides a seal to the central axis such that fluid is prevented from flowing across the seal during rotation.

* * * * *